(12) United States Patent
Tanaka et al.

(10) Patent No.: US 7,821,880 B2
(45) Date of Patent: Oct. 26, 2010

(54) SEMICONDUCTOR LASER DEVICE STRUCTURE, THERMALLY ASSISTED MAGNETIC HEAD, AND METHOD OF MANUFACTURING SAME

(75) Inventors: Kosuke Tanaka, Tokyo (JP); Yasuhiro Ito, Tokyo (JP)

(73) Assignee: TDK Corporation, Tokyo (JP)

( * ) Notice: Subject to any disclaimer, the term of this patent is extended or adjusted under 35 U.S.C. 154(b) by 229 days.

(21) Appl. No.: 12/197,494

(22) Filed: Aug. 25, 2008

(65) Prior Publication Data

US 2009/0059411 A1 Mar. 5, 2009

(30) Foreign Application Priority Data

Aug. 28, 2007 (JP) ............................... 2007-221492

(51) Int. Cl.
*G11B 11/00* (2006.01)
(52) U.S. Cl. ...................................... 369/13.33; 360/59
(58) Field of Classification Search .............. 369/13.33, 369/13.32, 13.12, 13.13; 360/59; 372/107
See application file for complete search history.

(56) References Cited

U.S. PATENT DOCUMENTS 6,261,858 B1 * 7/2001 Kitaoka et al. ................. 438/31

FOREIGN PATENT DOCUMENTS

| JP | A-61-174791 | 8/1986 |
|---|---|---|
| JP | A-08-181388 | 7/1996 |
| JP | A-2001-255254 | 9/2001 |
| JP | A-2003-114184 | 4/2003 |
| JP | A-2006-185548 | 7/2006 |

\* cited by examiner

*Primary Examiner*—Ali Neyzari
(74) *Attorney, Agent, or Firm*—Oliff & Berridge, PLC (57) ABSTRACT

A first alignment mark member is exposed at both of a mounting surface and a bonding surface, and thus can be seen from two directions by image sensors. While a semiconductor laser device is mounted on the mounting surface of a light source supporting substrate with reference to the first alignment mark member observed from the direction of the image sensor, the first alignment mark member can also be observed from the direction of the image sensor. With reference to the first alignment mark member observed from the latter direction, the light source supporting substrate is bonded to the slider substrate. Namely, though observed from different directions, the alignment mark member is used for a common reference for two securing operations, whereby attachment errors can be suppressed.

3 Claims, 6 Drawing Sheets

SEMICONDUCTOR LASER DEVICE STRUCTURE, THERMALLY ASSISTED MAGNETIC HEAD, AND METHOD OF MANUFACTURING SAME

BACKGROUND OF THE INVENTION

1. Field of the Invention

The present invention relates to a semiconductor laser device structure, a thermally assisted magnetic head, and a method of manufacturing the same.

2. Related Background Art

As hard disk dives have been increasing their recording density, thin-film magnetic heads have been required to further improve their performances. As the thin-film magnetic heads, those of composite type having a structure in which a magnetic detecting device such as magnetoresistive (MR) device and a magnetic recording device such as electromagnetic coil device are laminated have been in wide use, while these devices read/write data signals from/onto magnetic disks which are magnetic recording media.

In general, a magnetic recording medium is a sort of discontinuous body in which magnetic fine particles are assembled, while each magnetic fine particle has a single-domain structure. Here, one recording bit is constituted by a plurality of magnetic fine particles. Therefore, for enhancing the recording density, it is necessary to make the magnetic fine particles smaller, so as to reduce irregularities at boundaries of recording bits. When the magnetic fine particles are made smaller, however, their volume decreases, so that the thermal stability in magnetization may deteriorate, thereby causing a problem.

An index of the thermal stability in magnetization is given by $K_U V/k_B T$. Here, $K_U$ is the magnetic anisotropy energy of the magnetic fine particle, V is the volume of one magnetic fine particle, $k_B$ is the Boltzmann constant, and T is the absolute temperature. Making the magnetic fine particles smaller just reduces V, thereby lowering $K_U V/k_B T$ by itself, which worsens the thermal stability. Though $K_U$ may be made greater at the same time as measures against this problem, the increase in $K_U$ enhances the coercivity of the recording medium. On the other hand, the writing magnetic field intensity caused by a magnetic head is substantially determined by the saturated magnetic flux density of a soft magnetic material constituting a magnetic pole within the head. Therefore, no writing can be made if the coercivity exceeds a permissible value determined by the limit of writing magnetic field intensity.

Proposed as a method for solving such a problem in thermal stability of magnetization is a so-called thermally assisted magnetic recording scheme which applies heat to a magnetic recording medium immediately before applying a writing magnetic field, while using a magnetic material having a large value of $K_U$, so as to effect writing with lowered coercivity. This scheme is roughly classified into magnetic dominant recording and optical dominant recording. In the magnetic dominant recording, the writing is attributed to an electromagnetic coil device, while the radiation diameter of light is greater than the track width (recording width). In the optical dominant recording, in contrast, the writing is attributed to a light-radiating part, while the radiation diameter of light is substantially the same as the track width (recording width). Namely, the magnetic dominant recording and optical dominant recording impart space resolution to a magnetic field and light, respectively.

Meanwhile, near-field probes (plasmon antenna) are disclosed in Patent Document 1 (Japanese Patent Application Laid-Open No. 2001-255254) and Patent Document 2 (Japanese Patent Application Laid-Open No. 2003-114184), for example. Patent Document 1 arranges a near-field probe so as to make it oppose a phase-change medium, while Patent Document 2 states that it is applicable to optical recording. These documents arrange a conductive planar near-field-light-generating part on a medium-opposing surface (Air Bearing Surface). Patent Document 3 (Japanese Patent Application Laid-Open No. 2006-185548) discloses a thermally assisted magnetic head which irradiates a magnetic recording medium with laser light through an optical waveguide. The laser light is emitted from a semiconductor laser device. Magnetic recording can also be performed while directly irradiating the medium with the light from the semiconductor laser device.

In any case, it will be preferred in a laser device structure using a semiconductor laser device such as the one mentioned above to physically secure the semiconductor laser device and a slider including the optical waveguide to each other, so as to keep the semiconductor laser device and the core of the optical waveguide from being misaligned in terms of their optical coupling relationship.

SUMMARY OF THE INVENTION

However, it is necessary to secure the semiconductor laser device to a light source supporting substrate, and the light source supporting substrate to the slider. This requires two securing operations, which incur respective attachment errors, thereby lowering the attachment accuracy in the relative positional relationship between the semiconductor laser device and slider. When the accuracy is low in the laser light advancing direction in a thermally assisted magnetic head in particular, an ultrafine recording area cannot precisely be irradiated with the light, whereby precise magnetic recording may not be achieved.

In view of such a problem, it is an object of the present invention to provide a semiconductor laser device structure with an improved attachment accuracy, a thermally assisted magnetic head capable of precise magnetic recording, and a method of manufacturing the same.

For achieving the above-mentioned object, the present invention provides a semiconductor laser device structure comprising a semiconductor laser device; a light source supporting substrate mounting the semiconductor laser device; and an optical waveguide supporting substrate, bonded to the light source supporting substrate, having an optical waveguide for introducing therein light from the semiconductor laser device; wherein the light source supporting substrate has a first alignment mark member embedded therewithin; and wherein the first alignment mark is exposed at a mounting surface of the semiconductor laser device and at a bonding surface of the light source supporting substrate with the optical waveguide supporting substrate.

The first alignment mark member is exposed at both the mounting and bonding surfaces and thus can be observed from two directions. While the semiconductor laser device is mounted on the mounting surface of the light source supporting substrate with reference to the first alignment mark member as observed from one direction, the first alignment mark can also be observed from another direction. With reference to the first alignment mark member as observed from the latter direction, the light source supporting substrate can be bonded to the optical waveguide supporting substrate. Namely, though observed from different directions, the same alignment mark member is used for a common reference for two securing operations, whereby attachment errors can be suppressed. Therefore, the laser light emitted from the semiconductor laser device accurately enters the light entrance surface of the optical waveguide and reaches its light exit end.

Preferably, the light source supporting substrate has second and third alignment mark members exposed at the mounting surface, while the second and third alignment mark members are equidistant from a light exit surface of the semiconductor laser device and extend parallel to the light exit surface.

In is case, the light exit surface of the semiconductor laser device is parallel to the direction in which the second and third alignment mark members extend, whereby the light exit surface is accurately mounted with reference to this direction.

Preferably, the exposed surface of the first alignment mark member on the mounting surface is positioned between the second and third alignment mark members, while a fourth alignment mark member embedded within the substrate is exposed at a position separated along a resonator length of the semiconductor laser device from the exposed surface. Arranging a resonator along a line connecting the first and fourth alignment mark members accurately orients the resonator length direction to an area between the second and third alignment mark members.

The thermally assisted magnetic head in accordance with the present invention includes a magnetic recording device adjacent to the light exit surface of the optical waveguide in the above-mentioned semiconductor laser device structure. Since the laser light emitted from the semiconductor laser device accurately reaches the light exit surface of the optical waveguide, near-field light is emitted from a near-field-light-generating device provided at the light exit surface if any, or the laser light is emitted to the outside with a high accuracy when there is no near-field-light-generating device, so that a recording medium is irradiated with any of these light emissions, whereby the irradiated area is heated. Since the magnetic recording device is arranged at the light exit surface, information can be written with a high accuracy in the recording area heated in a thermally assisted manner.

The method of manufacturing the above-mentioned semiconductor laser device structure in accordance with the present invention comprises the steps of bonding the semiconductor laser device to the light source supporting substrate such that an exposed position of the first alignment mark member on the mounting surface align with a light exit surface position of a resonator of the semiconductor laser device, and bonding the optical waveguide supporting substrate to the light source supporting substrate with reference to an exposed position of the first alignment mark member on the bonding surface.

Since the first alignment mark member is a common member which can be observed from two directions, bonding with reference to this member can accurately fix the positional relationship between the light exit surface of the resonator and the optical waveguide.

Since the semiconductor laser device structure in accordance with the present invention has an improved attachment accuracy, the thermally assisted magnetic head using the same enables precise magnetic recording. The manufacturing method in accordance with the present invention can accurately fix the positional relationship between the light exit surface of the resonator and the optical waveguide.

DESCRIPTION OF THE PREFERRED EMBODIMENTS

In the following, a thermally assisted magnetic head as a semiconductor laser device structure in accordance with an embodiment will be explained. The same constituents will be referred to with the same numerals or letters while omitting their overlapping explanations.

Figure 1:
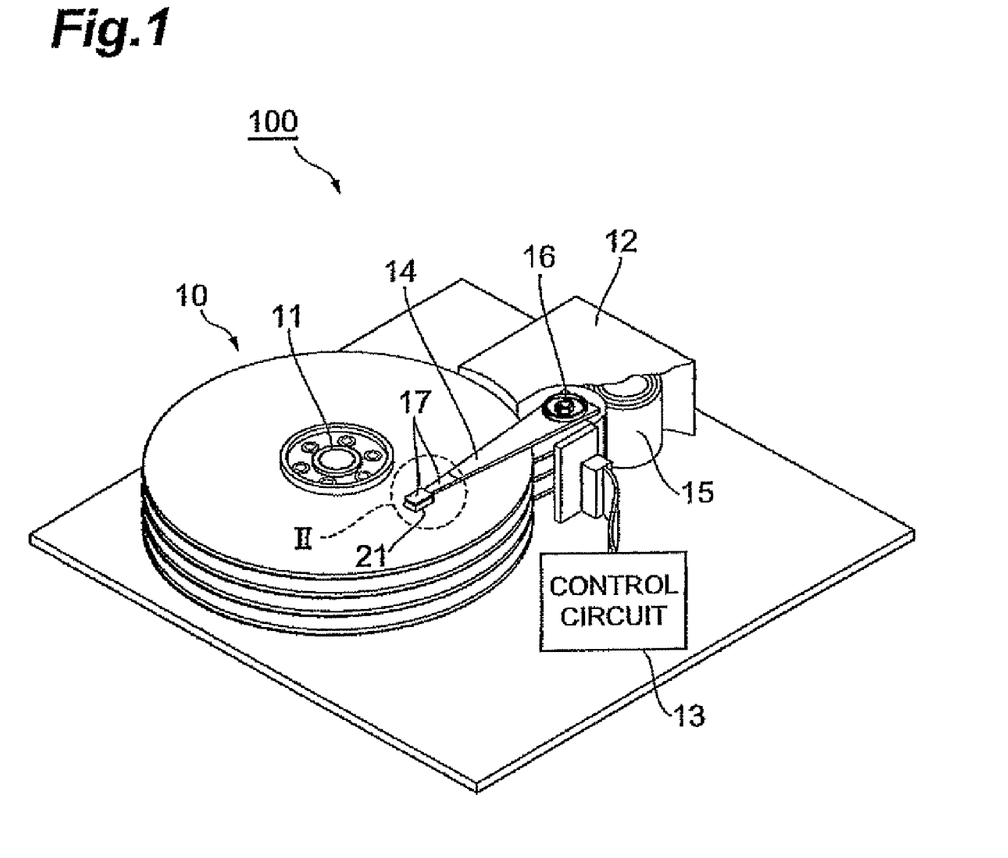
FIG. 1 is a perspective view showing a hard disk drive in accordance with an embodiment.

FIG. 1 is a perspective view of a hard disk drive mounted with the thermally assisted magnetic head in accordance with the embodiment.

The hard disk drive 100 comprises a plurality of magnetic disks 10 which are magnetic recording media rotating about a rotary shaft of a spindle motor 11, an assembly carriage apparatus 12 for positioning thermally assisted magnetic heads 21 onto tracks, and a read/write and emission control circuit (control circuit) 13 for controlling writing and reading actions of the thermally assisted magnetic heads 21 and regulating a semiconductor laser device (laser diode) which is a light source for generating laser light for thermally assisted magnetic recording.

The assembly carriage apparatus 12 is provided with a plurality of driving arms 14. These driving arms 14 can be swung about a pivot bearing shaft 16 by a voice coil motor (VCM) 15, and are laminated in a direction along the pivot bearing shaft 16. A head gimbal assembly (HGA) 17 is attached to a leading end part of each driving arm 14. Each HGA 17 is provided with the thermally assisted magnetic head 21 opposing the front face of its corresponding magnetic disk 10. In the thermally assisted magnetic head 21, the surface opposing the front face of the magnetic disk 10 is the medium-opposing surface (see FIG. 2; also known as air bearing surface) S. The magnetic disk 10, driving arm 14, HGA 17, and thermally assisted magnetic head 21 may be provided singly as well.

Figure 2:
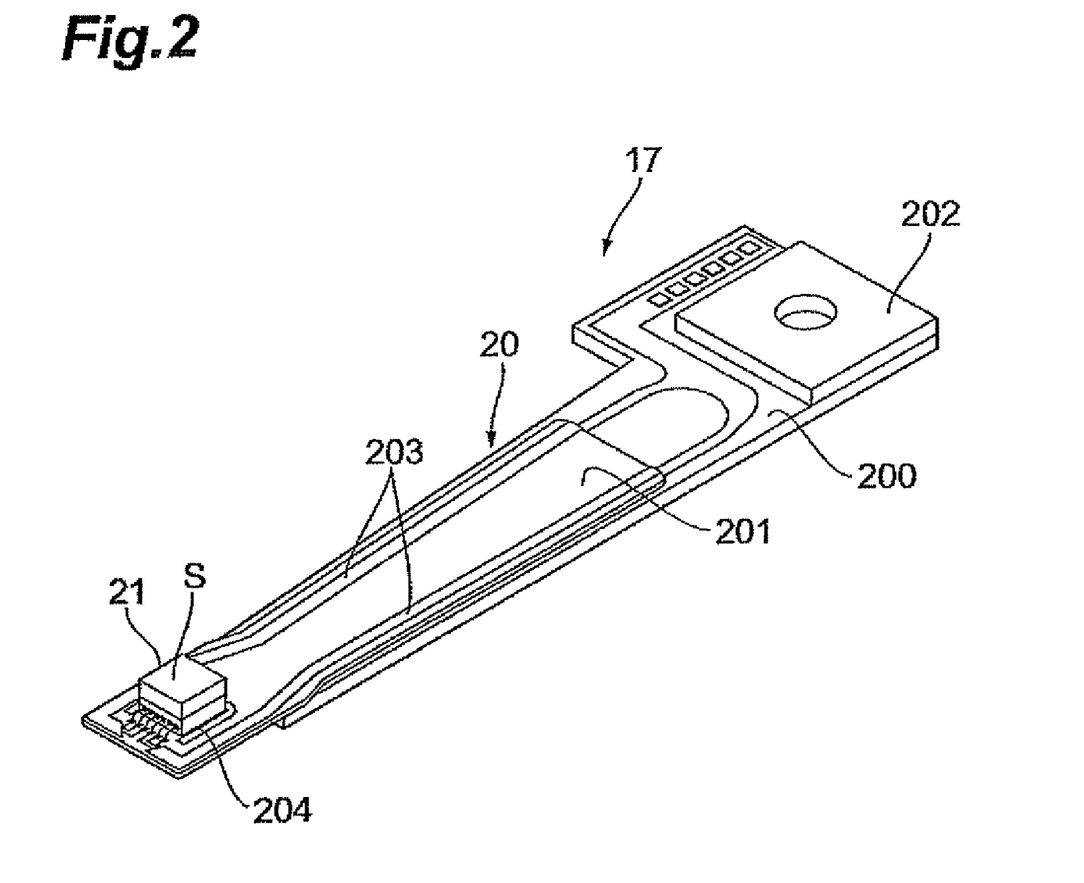
FIG. 2 is a perspective view of an HGA 17.

FIG. 2 is a perspective view of the HGA 17. This drawing shows the HGA 17 with its medium-opposing surface S facing up.

The HGA 17 is constructed by firmly attaching the thermally assisted magnetic head 21 to a leading end part of a suspension 20 and electrically connecting one end of a wiring member 203 to a terminal electrode of the thermally assisted magnetic head 21. The suspension 20 is mainly constituted by a load beam 200, an elastic flexure 201 firmly attached onto and supported by the load beam 200, a tongue 204 formed like a leaf spring at the leading end of the flexure 201, a base plate 202 provided at a base part of the load beam 200, and the wiring member 203, which is formed on the flexure 201 and comprises lead conductors and connecting pads electrically connected to both ends of the lead conductors.

It is clear that the structure of suspension in the HGA 17 is not limited to that mentioned above. Though not depicted, an IC chip for driving the head may be mounted somewhere in the suspension 20.

Figure 3:
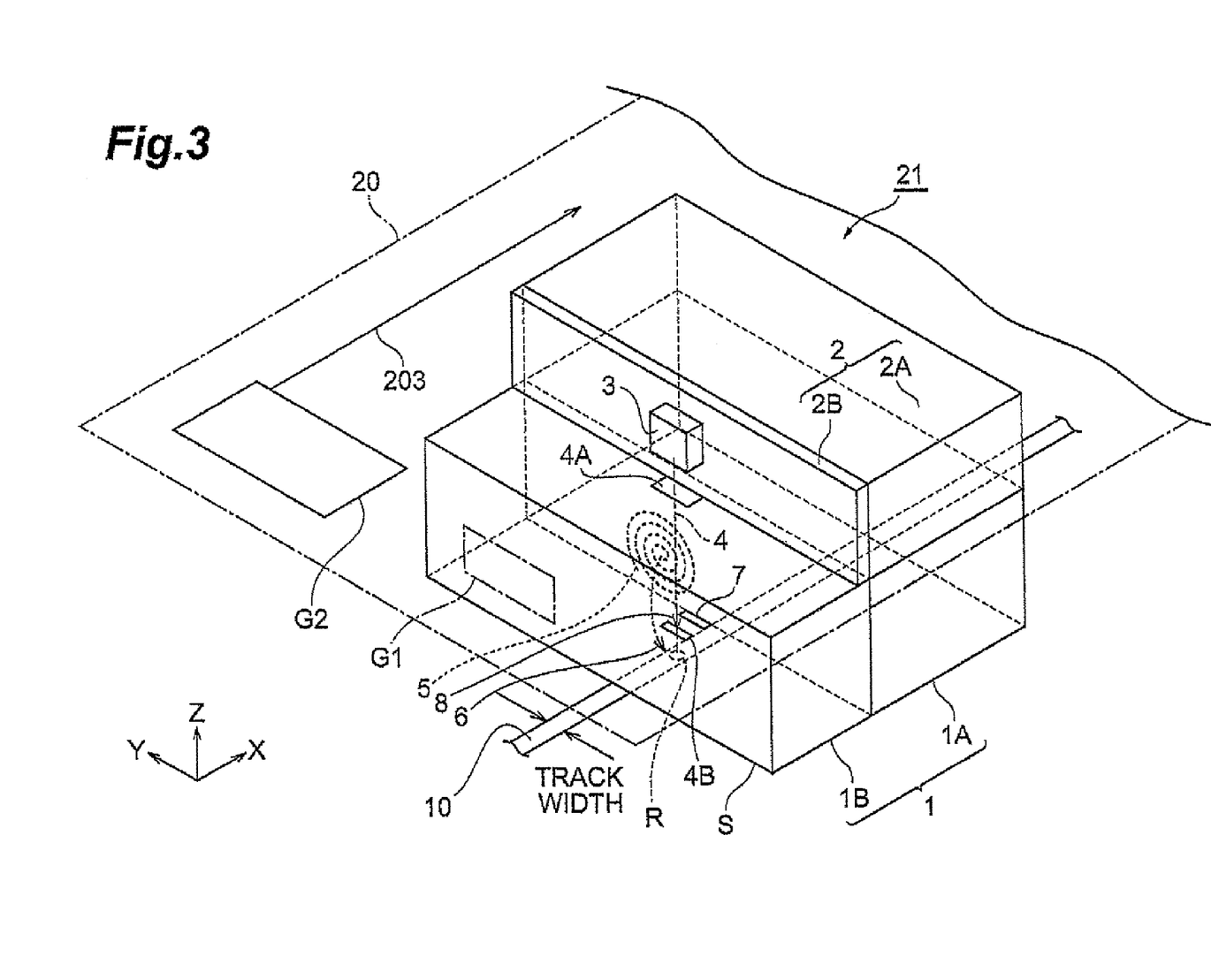
FIG. 3 is an enlarged perspective view of a thermally assisted magnetic head 21 shown in FIG. 1 and its vicinity.

FIG. 3 is an enlarged perspective view of the thermally assisted magnetic head 21 shown in FIG. 1 and its vicinity.

The thermally assisted magnetic head 21 is attached to the leading end part of the suspension 20. The thermally assisted magnetic head 21 is constructed by bonding a slider 1 and a light source unit 2 together. The slider 1 has a magnetic head part 1B formed on the YZ plane of a slider substrate 1A. The XY plane on the -Z direction side of the magnetic head part 1B forms the medium-opposing surface S. On the other hand, the light source unit 2 has an insulating layer 2B on the YZ plane of the light source supporting substrate 2A, while a semiconductor laser device 3 is secured onto the YZ plane of the insulating layer 2B.

The magnetic head part 1B includes a plurality of devices embedded within an insulator. These devices are a helical coil 5 adapted to generate a magnetic field in response to a current supplied thereto, a main magnetic pole 6 extending from the center of the coil so as to guide a magnetic flux generated in the coil 5 to the medium-opposing surface S, a magnetoresistive device (MR device) 7 having a magnetosensitive surface exposed at the medium-opposing surface S, and a core 4 of a waveguide extending along the Z axis while using its surrounding insulator as a cladding.

The main magnetic pole 6 is not required to be exposed at the medium-opposing surface S as in this embodiment, but may be placed at any position as long as it can supply a magnetic field to a recording area R on the surface of the magnetic disk 10. An auxiliary magnetic pole may be provided near the main magnetic pole 6 if necessary, so that a magnetic line of force from the main magnetic pole 6 flows into the auxiliary magnetic pole through the recording area R.

The core 4 has a light entrance surface 4A, on which light from the semiconductor laser device 3 is incident, on the XY plane on the positive side of the Z axis, and a light exit surface 4B on the XY plane on the negative side of the Z axis, i.e., on the medium-opposing surface S side. In this embodiment, the semiconductor laser device 3 is an edge-emitting laser diode, so that laser light emitted from an end face parallel to the XY plane enters the core 4 through the light exit surface 4A and irradiates a near-field-light-generating device 8 formed on the light exit surface 4B.

The near-field-light-generating device 8 generates near-field light in resonance with incident light, and the near-field light heats the recording area R. When the magnetic line of force from the main magnetic pole 6 enters the heated recording area R, information is written into the recording area R.

An electrode pad group G1 constituted by a plurality of electrode pads is formed on the YZ plane on the negative side of the X axis in the magnetic head part 1B. The electrode pads are connected to both ends of the coil 5 and upper and lower electrodes of the MR device 7, respectively. The MR device 7, which is formed by laminating a fixed layer having a fixed magnetization direction and a free layer whose magnetization direction deflects according to a magnetic field thereabout, changes its magnetic resistance depending on the difference between the magnetization directions of the free and fixed layers. Namely, in response to the magnetic field occurring about the recording area R, the magnetic resistance of the MR device 7 changes, thereby altering a current flowing between a pair of electrode pads in the electrode pad group G1. Hard magnets are arranged at both ends in the Y-axis direction of the free layer.

At the time of writing, a current is caused to flow between another pair of electrode pads in the electrode pad group G1, so that the current flows between both ends of the coil 5. As the magnetic recording device, that of perpendicular magnetic recording type is preferred. The electrode pads in the electrode pad group G1 are electrically connected to a second electrode pad group G2 formed on the suspension 20, and to the outside through the wiring member 203. The second electrode pad group G2 connected to the wiring member 203 includes a pair of electrode pads for supplying a driving current to the semiconductor laser device 3. When a driving current flows between these electrode pads, the semiconductor laser device 3 emits light.

The core 4 extends linearly along the Z axis in this embodiment, though it may have various forms. For clarifying the explanation, the core 4 is referred to with the same numeral as that for the optical path of the light from the semiconductor laser device 3.

The slider substrate 1A and light source supporting substrate 2A are constituted by AlTiC ($Al_2O_3$—TiC), for example. These substrates 1A, 2A will exhibit a heat dissipating function if substrates having a high thermal conductivity are used therefor. The XY plane on the positive side of the Z axis in the light source supporting substrate 2A is bonded to the rear face of the suspension 20.

The magnetic head part 1B is constructed by laminating the MR device 7, cladding, core 4, coil 5, and main magnetic pole 6 along the X axis. This laminating direction extends along the arranging direction of the recording area R within a track, while the track width is parallel to the Y axis.

The thermally assisted magnetic head 21, which is a semiconductor laser device structure, includes the main magnetic pole 6 as a magnetic recording device adjacent to the light exit surface 4B of its optical waveguide (core). The main magnetic pole 6 and light exit surface 4B are located close to each other to such an extent that writing can be effected before the heated recording area R is cooled to the original temperature.

Figure 4:
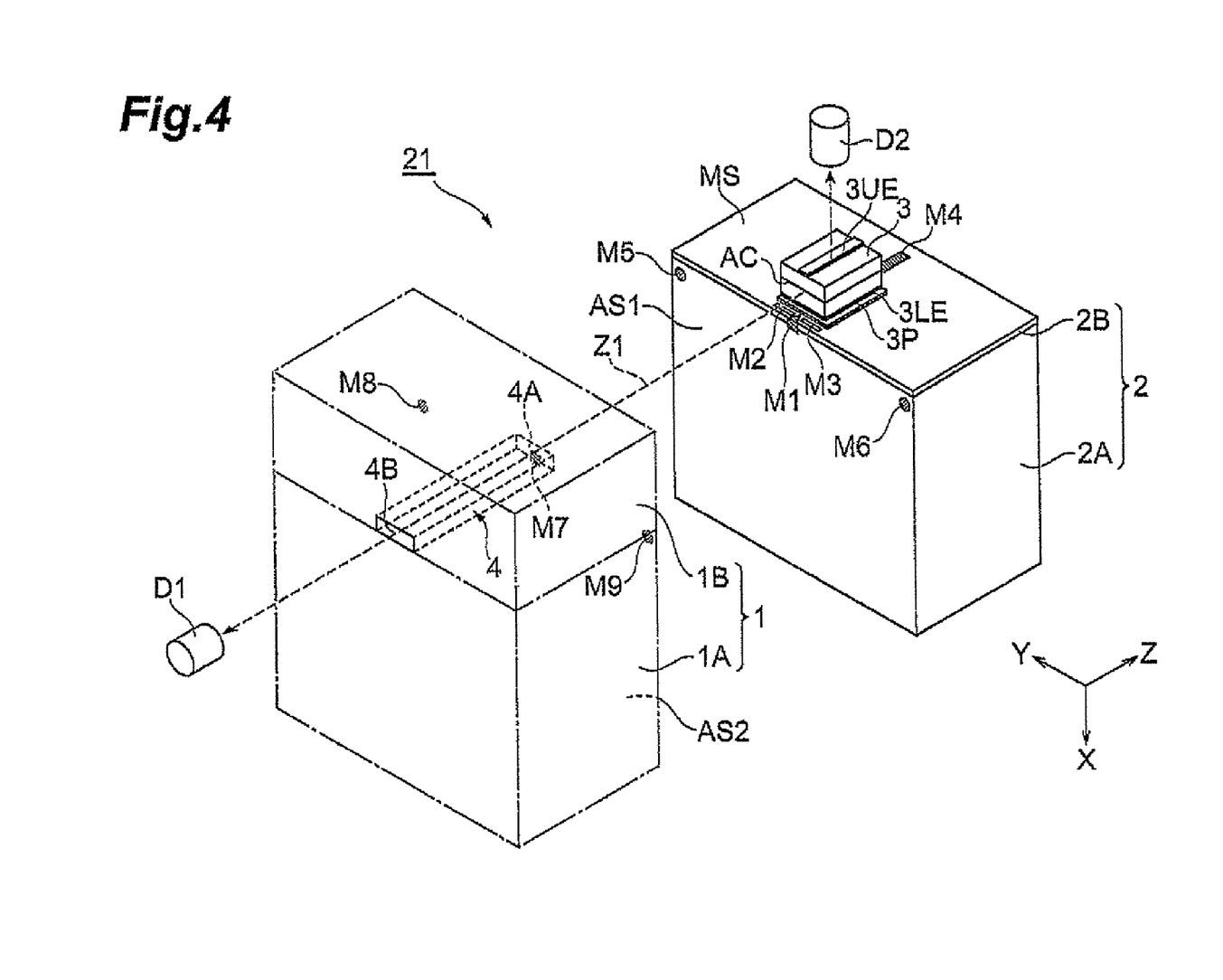
FIG. 4 is a perspective view of the thermally assisted magnetic head at the time of assembling.
Figure 5:
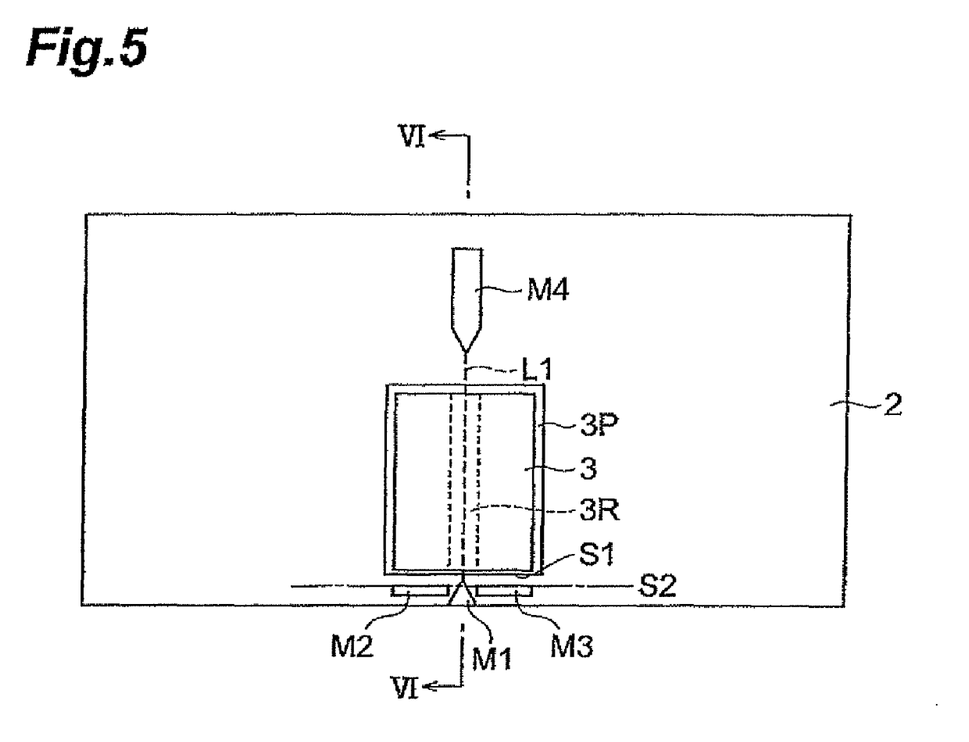
FIG. 5 is a plan view of a light source supporting substrate.
Figure 6:
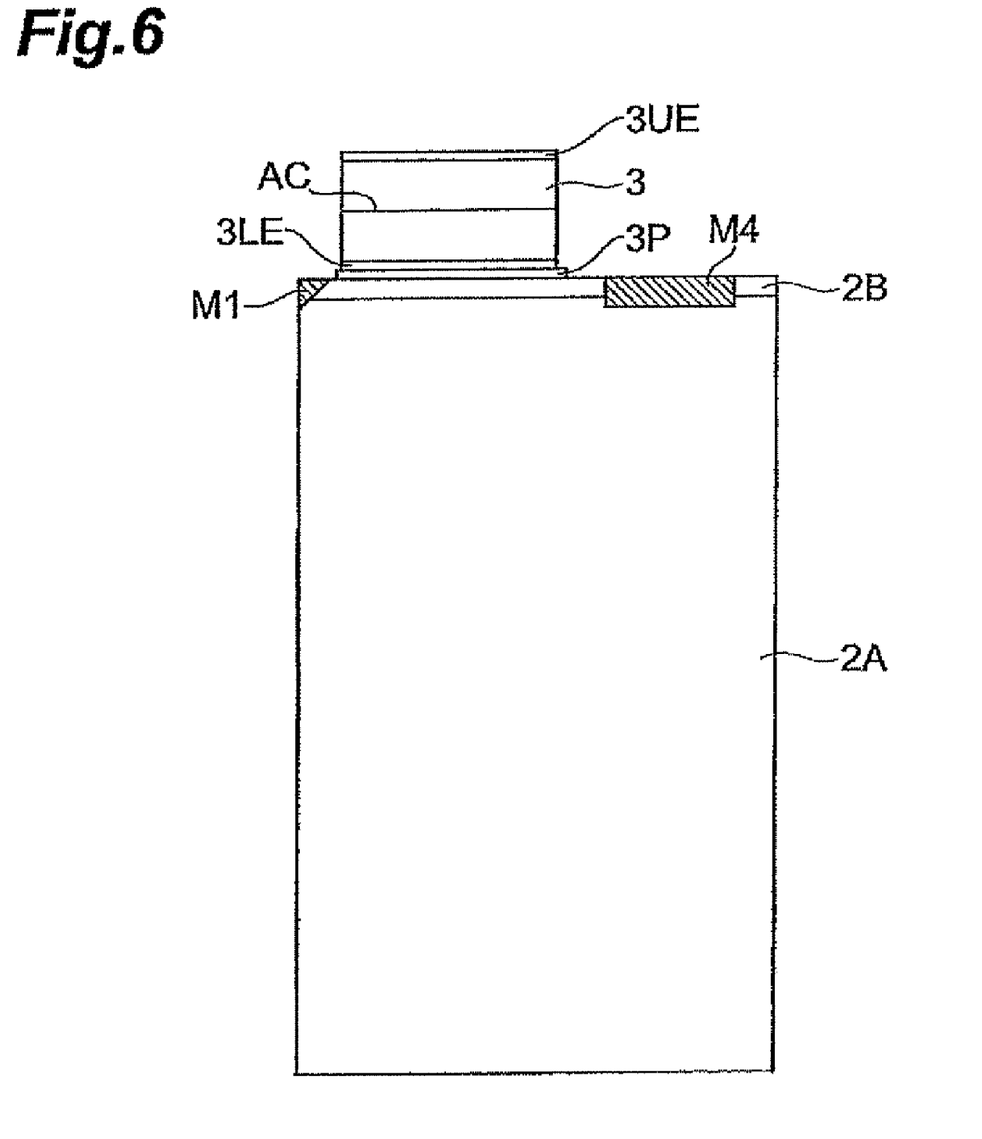
FIG. 6 is a view of the light source supporting substrate taken along the line VI-VI of FIG. 5.

FIG. 4 is a perspective view of the thermally assisted magnetic head at the time of assembling. FIG. 5 is a plan view of the light source supporting substrate. FIG. 6 is a view of the light source supporting substrate taken along the line VI-VI of FIG. 5.

An electrode pad 3P is provided on an insulating layer 2B on the light source supporting substrate 2A, to which a lower electrode 3LE of the semiconductor laser device 3 including the electrode pad 3P is bonded. For bonding them, a conductive adhesive such as silver paste is used. Namely, the semiconductor laser device 3 is bonded onto a mounting surface MS of the light source supporting substrate 2A. A substrate including the light source supporting substrate 2A and insulating layer 2B is also considered to be a light source supporting substrate. If the light source supporting substrate 2A is an insulating substrate, the insulating layer 2B may be omitted.

The semiconductor laser device 3 has an active layer AC held between semiconductor cladding layers. An upper electrode 3UE of the semiconductor laser device 3 is formed like a stripe, so as to concentrate a current supplied to the active layer AC. Current-confining areas may be arranged at both ends in the Y-axis direction of the active layer AC, so as to concentrate the current into the active layer AC.

The slider 1 is arranged such that the laser light emitted from the active layer AC is incident on the light entrance surface 4A, and bonded by an adhesive to a bonding surface AS1 of the light source supporting substrate 2A. The thermally assisted magnetic head 21 has the semiconductor laser device 3, the light source supporting substrate 2A mounting the semiconductor laser device 3, and the optical waveguide 4 into which the light from the semiconductor laser device 3 is introduced, while the slider substrate (optical waveguide supporting substrate) 1A is bonded to the light source supporting substrate 2A. The light source supporting substrate 2A has a first alignment mark member M1 embedded within the substrate. The first alignment mark member M1 is exposed at the mounting surface MS of the semiconductor laser device 3, and at the bonding surface AS1 of the light source supporting substrate 2A with the slider substrate 1A.

The bonding surface AS1 is also provided with other alignment mark members M5, M6. The bonding surface AS2 of the slider substrate 1A is formed with alignment mark members M7, M8, M9 which are overlaid on the alignment mark members M1, M5, M6, respectively.

The light source supporting substrate 2A has second and third alignment mark members M2, M3 exposed at the mounting surface MS. The second and third alignment mark members M2, M3 are equidistant from the light exit surface S1 (see FIG. 5) of the semiconductor laser device 3 and extend parallel to the light exit surface S1. The light exit surface S1 is the XY plane on the negative side of the Z axis in the semiconductor laser device 3.

The exposed surface of the first alignment mark member M1 on the mounting surface MS is positioned between the second and third alignment mark members M2, M3, while a fourth alignment mark member M4 embedded within the substrate is exposed at a position separated along the resonator length (resonator 3R; see FIG. 5) of the semiconductor laser device 3 from the exposed surface.

When manufacturing the thermally assisted magnetic head 21, metals to become the alignment mark members are initially embedded within a ceramic substrate made of AlTiC or the like, and the resulting product is cut into a rectangular parallelepiped, so as to expose end faces of the alignment mark members at cut sections. Though the insulating layer 2B is not used here, cutting and polishing may be performed after applying the insulating layer 2B as depicted, so as to form the substrate. In the XZ section, as shown in FIG. 6, the alignment mark members M1, M4 within the substrate have a right triangle form and a rectangular form, respectively.

For embedding, the metals may be deposited by plating within a recess formed by cutting the substrate.

After forming the light source supporting substrate 2A, the electrode pad 3P is formed on the mounting surface MS, and an adhesive is applied thereon.

Next, while observing the mounting surface MS with an image sensor D2 arranged on the X axis, the leading end position of the exposed surface of the first alignment mark member M1 on the mounting surface MS and the light exit surface position of the resonator 3R in the semiconductor laser device 3 are aligned with each other. Namely, the exposed position of the first alignment mark member M1 on the mounting surface MS and the position of the light exit surface S1 of the resonator 3R in the semiconductor laser device 3 are aligned with each other. The exposed surface of the first alignment mark member M1 on the mounting surface MS is triangular as shown in FIG. 5.

The orientation of the semiconductor laser device 3 about the X axis is adjusted such that the light exit space S1 and the extending direction of the second and third alignment mark members M2, M3 are parallel to each other. This makes it possible to mount the light exit surface S1 of the semiconductor laser device 3 accurately with reference to the extending direction (Y axis) of the second and third alignment mark members M2, M3. As shown in FIG. 5, the second and third alignment mark members M2, M3 align with each other along the Y axis, and the orientation of the semiconductor laser device 3 is adjusted such that their side face S2 on the semiconductor laser device 3 side and the light exit surface S1 are parallel to each other.

As shown in FIG. 5, the resonator 3R is arranged along a line L1 connecting the first and fourth alignment mark members M1, M4, whereby the resonator length (Z axis) is her accurately directed to the area between the second and third alignment mark members M2, M3.

In the foregoing manner, the semiconductor laser device 3 is bonded to the light source supporting substrate 2A.

Next, with reference to the exposed position of the first alignment mark member M1 on the bonding surface AS1, the slider substrate 1A is bonded to the light source supporting substrate 2A. Here, the bonding surface AS1 is observed with an image sensor D1. Through the optical waveguide 4, the image sensor D1 can also observe laser light Z1 emitted from the semiconductor laser device 3.

The positions of the alignment mark members M7, M8, M9 on the bonding surface AS2 of the slider substrate 1A have been stored in a memory beforehand. Subsequently, an image of the bonding surface AS1 is captured by the image sensor D1, whereby the positions of the alignment mark members M1, M5, M6 are stored. Thereafter, respective stages holding the slider substrate 1A and light source supporting substrate 2A are driven so that the corresponding alignment mark members align with each other. After the positions of corresponding alignment mark members align with each other, the slider substrate 1A and light source supporting substrate 2A are brought closer to each other so as to reduce their distance in the Z-axis direction and bonded together. Light is emitted from the semiconductor laser device 3 immediately before the bonding. After whether the laser light Z1 is emitted through the optical waveguide 4 or not is determined by the image sensor (photodetector) D1, the bonding is performed.

The image sensor D1 may be an X-ray image sensor, so as to irradiate the light source supporting substrate 2A and slider substrate 1A with X-rays from the side opposite from the image sensor, and the stages may be driven such that the positions of corresponding alignment mark members are overlaid on each other, so as to be aligned.

Since the first alignment mark member M1 is a common member which can be observed from two directions, bonding with reference to this member can accurately fix the positional relationship between the light exit surface of the resonator 3R and the optical waveguide 4 in the above-mentioned method.

In particular, the first alignment mark member M1 is exposed at both the mounting surface MS and bonding surface AS1, and thus can be observed from two directions by the image sensors D2, D1. While the semiconductor laser device 3 is mounted on the mounting surface MS of the light source supporting substrate 2A with reference to the first alignment mark member M1 observed from the direction of the image sensor D2, the first alignment mark member M1 can also be observed from the direction of the image sensor D1. With reference to the first alignment mark member M1 observed from the later direction, the light source supporting substrate 2A is bonded to the slider substrate 1A. Namely, though observed from different directions, the alignment mark member M1 is used for a common reference for two securing operations, whereby attachment errors can be suppressed. Therefore, the laser light emitted from the semiconductor laser device 3 is accurately incident on the light entrance surface 4A of the optical waveguide, and reaches the light exit surface 4B.

Thus, the laser light emitted from the semiconductor laser device 3 accurately reaches the light exit surface 48 of the optical waveguide 4 in the thermally assisted magnetic head 21 in accordance with the above-mentioned embodiment, whereby near-field light can be emitted from the near-field-light-generating device 8 provided on the light exit surface 413 if any.

When no near-field-light-generating device is provided on the light exit surface 4B, the laser light is emitted to the outside with a high accuracy. When a recording medium is irradiated with near-field light or laser light, the irradiated region is heated. Since the main magnetic pole 6 as a magnetic recording device is arranged on the light exit surface 4B as shown (with an arrow) in FIG. 3, information can be written with a high accuracy in the recording area R heated in a thermally assisted manner.

What is claimed is:

1. A semiconductor laser device structure comprising:
    a semiconductor laser device;
    a light source supporting substrate mounting the semiconductor laser device; and
    an optical waveguide supporting substrate, bonded to the light source supporting substrate, having an optical waveguide for introducing therein light from the semiconductor laser device,
    wherein the light source supporting substrate has a first alignment mark member embedded therewithin,
    wherein the first alignment mark is exposed at a mounting surface of the semiconductor laser device and at a bonding surface of the light source supporting substrate with the optical waveguide supporting substrate,
    wherein the light source supporting substrate has second and third alignment mark members exposed at the mounting surface, while the second and third alignment mark members are equidistant from a light exit surface of the semiconductor laser device and extend parallel to the light exit surface, and
    wherein the exposed surface of the first alignment mark member on the mounting surface is positioned between the second and third alignment mark members, while a fourth alignment mark member embedded within the substrate is exposed at a position separated along a resonator length of the semiconductor laser device from the exposed surface.

2. A thermally assisted magnetic head including a magnetic recording device adjacent to a light exit surface of the optical waveguide in the semiconductor laser device structure according to claim 1.

3. A method of manufacturing the semiconductor laser device structure according to claim 1, the method comprising the steps of:
    bonding the semiconductor laser device to the light source supporting substrate such that an exposed position of the first alignment mark member on the mounting surface aligns with a light exit surface position of a resonator of the semiconductor laser device; and
    bonding the optical waveguide supporting substrate to the light source supporting substrate with reference to an exposed position of the first alignment mark member on the bonding surface.

* * * * *